United States Patent [19]

Warren

[11] 4,335,394
[45] Jun. 15, 1982

[54] CROSSTALK FILTERING ARRANGEMENT WITH VARIABLE FREQUENCY FILTERING TO REMOVE EFFECTS OF FM CARRIER

[75] Inventor: Henry R. Warren, Belle Mead, N.J.

[73] Assignee: RCA Corporation, New York, N.Y.

[21] Appl. No.: 105,111

[22] Filed: Dec. 19, 1979

[51] Int. Cl.³ ............................................. H04N 5/795
[52] U.S. Cl. .......................................... 358/8; 358/36; 358/127; 358/167; 360/30; 360/33; 455/304; 455/306
[58] Field of Search ....................... 358/4, 8, 9, 31, 36, 358/39, 40, 127, 128, 130, 131, 132, 167; 360/33, 30; 179/100.1 R, 100.1 TD, 100.4 ST, 100.1 G, 100.3 V, 1 P; 455/303–306, 146, 278; 370/6; 333/70 T

[56] References Cited

U.S. PATENT DOCUMENTS

| | | | |
|---|---|---|---|
| 3,242,259 | 3/1966 | Keiper, Jr. | 358/36 |
| 3,480,867 | 11/1969 | Sichak | 455/304 |
| 3,830,968 | 8/1974 | Redlich et al. | 358/127 |
| 3,893,168 | 7/1975 | Bechly et al. | 358/8 |
| 3,935,536 | 1/1976 | Kimura et al. | 455/304 |
| 3,996,610 | 12/1976 | Kawamoto | 358/31 |
| 4,051,533 | 9/1977 | Griffiths | 358/167 |
| 4,143,396 | 3/1979 | MacKenzie | 358/8 |
| 4,166,251 | 8/1979 | Ishigaki et al. | 329/132 |
| 4,208,673 | 1/1980 | Numakura | 358/8 |

FOREIGN PATENT DOCUMENTS

| | | | |
|---|---|---|---|
| 54-100216 | 8/1979 | Japan | 358/36 |
| 1495784 | 12/1977 | United Kingdom | 179/100.1 G |
| 421143 | 7/1974 | U.S.S.R. | 358/36 |

Primary Examiner—Raymond F. Cardillo, Jr.
Attorney, Agent, or Firm—Eugene M. Whitacre; Paul J. Rasmussen; William H. Meise

[57] ABSTRACT

The effects of crosstalk of an FM carrier from a first signal channel into a second signal channel are reduced by a variable-frequency notch filter coupled in the second channel. The frequency of the notch in the transmission characteristic of the filter is controlled to track the frequency of the FM carrier. Signals in the second channel at the frequency of the FM carrier are attenuated, and therefore the crosstalk signal is attenuated and its effects reduced.

15 Claims, 4 Drawing Figures

CROSSTALK FILTERING ARRANGEMENT WITH VARIABLE FREQUENCY FILTERING TO REMOVE EFFECTS OF FM CARRIER

BACKGROUND OF THE INVENTION

This invention relates to crosstalk reduction or rejection between signal channels.

In tape recording, low-frequency response problems prevent the recording of broad instantaneous bandwidth materials. For example, recording of composite chrominance and luminance information cannot readily be accomplished. Head-to-tape contact varies with time, and as a consequence video tape recorders use FM modulation to improve signal-to-noise and frequency response. The bandwidth problem remains in such systems, however, and often the luminance information is recorded separately from the chrominance information. In such cases, the luminance is frequency-modulated on a high-frequency carrier for best noise performance, while the less critical chrominance information is directly modulated with the aid of an AC bias signal onto the same track as the luminance information. In order to reduce the interfering beats between the FM luminance carrier and the AC bias signal, the FM carrier may itself be used as the AC bias signal, although the FM carrier amplitude must be reduced from the maximum possible amplitude to avoid saturation of the tape and consequent distortion of the chrominance signal. The directly recorded chrominance signal can occupy only that portion of the frequency spectrum below the lowest deviation frequency of the luminance carrier.

In order to obtain greater chrominance fidelity, increased bandwidth may be desirable. This bandwidth is not available in the track on which the luminance information is recorded, so the chrominance information may be recorded onto a separate adjacent track. On that track, the chrominance information may be directly recorded. Since the desired bandwidth of the chrominance carrier is greater than the bandwidth available below the lowest deviation frequency of the luminance information carrier on the adjacent track, a portion of the chrominance information band of frequencies lies within the band of frequency used for the luminance information. Imprinting from track to track of the tape or coupling between the tracks and adjacent playback heads causes crosstalk between the two signal channels (luminance and chrominance) in the frequency overlap region. Electrical filtration of the signals cannot be used to eliminate the undesired signals occurring in the overlap region because the desired signals would also be eliminated. The unwanted coupling may be reduced by azimuth recording or by providing a guardband between the tracks of the tape as described for example in U.S. patent application Ser. No. 084,395 filed Oct. 12, 1979. However, these schemes are not totally effective and in any case will not reduce cross-coupling between signal channels arising from direct inductive coupling between the playback heads.

Further improvement in chrominance signal-to-noise performance in the two track arrangement may be achieved by frequency-modulating a carrier with the chrominance information in much the same manner as the luminance. However, this degrades the crosstalk or cross-coupling still further, because the luminance and chrominance signals may occupy the same frequency band, and increased coupling occurs between the luminance and chrominance pickup heads.

It is desirable to reduce the effects of coupling between adjacent signal channels where one of the channels contains information modulated onto an FM carrier.

SUMMARY OF THE INVENTION

A first signal channel carries a frequency-modulated carrier signal, which crosstalks onto a second signal channel. A variable-frequency notch filter is coupled in the second signal channel and the frequency of the notch is controlled to equal the frequency of the carrier in the first channel for filtering from the second channel those signals at the instantaneous frequency of the frequency-modulated carrier so as to reduce the effects of the crosstalk on the second channel.

DESCRIPTION OF THE INVENTION

Figure 1:
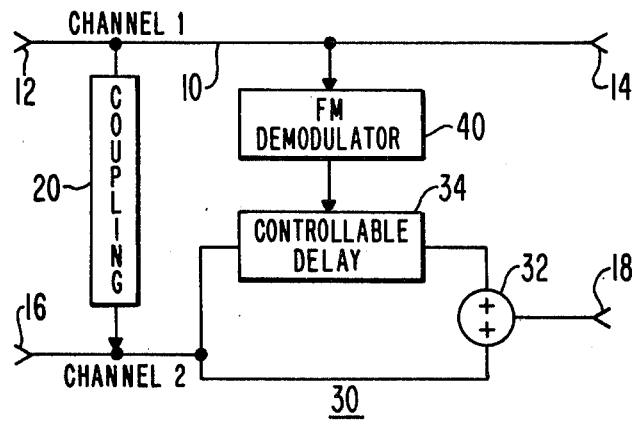
FIG. 1 illustrates an arrangement of two signal channels with a crosstalk filtering arrangement in accordance with the invention.

In FIG. 1, a first signal channel is illustrated as a conductor 10 coupled between terminals 12 and 14. A terminal 16 couples signals flowing in a second channel to an output terminal 18. A cross-coupling path is represented as a coupling block 20 interconnecting terminals 12 and 16. The coupling may be a discrete impedance element or may be stray coupling such as stray inductance or capacitance. As a result of the presence of coupling 20, signals appearing in the first channel will be coupled to the second channel with an amplitude which depends upon the magnitude of the coupling impedance.

A notch filter designated generally as 30 is in the form of a transversal filter and includes a two-input summing device 32, one input of which is coupled to terminal 16. The output of summing device 32 is coupled to output terminal 18 of the second channel. Transversal filter 30 also includes a controllable signal delay arrangement illustrated as a block 34. Controllable delay 34 is coupled between input terminal 16 of channel 2 and a second input terminal of summing device 32. The arrangement of controllable delay 34 and summing device 32 interposed between terminals 16 and 18 forms a transversal or comb filter having a null in the transmission response between terminals 16 and 18 at those frequencies at which the delay of controllable delay 34 is equal to an odd integer multiple of half the period or duration of the signal (odd multiples of 180°). Thus, signal cannot pass between terminals 16 and 18 whenever the delay of controllable delay 34 is 180°, 540°, 900°, etc. Signals at other frequencies can pass through the filter.

The delay control input terminal of controllable delay 34 is coupled to the output of a frequency demodulator 40. Demodulator 40 is coupled to conductor 10 of channel 1. Demodulator 40 may be any known type, such as a pulse-counting discriminator, which produces an instantaneous output voltage proportional to the instantaneous frequency of the signal on conductor 10.

As the frequency of the signal on conductor 10 varies, the output voltage of demodulator 40 also varies, thereby controlling the magnitude of delay 34. The characteristics of demodulator 40 and delay 34 may be selected to maintain the delay duration of controllable delay 34 approximately equal to the duration of one-half cycle or an odd integer multiple of one-half cycle of the signal on conductor 10. With such a proportioning, nulls appear in the transmission response between terminals 16 and 18 at the frequency of the signal on conductor 10 and at odd harmonics of that frequency. Consequently, that portion of the signal on conductor 10 which is coupled by coupling 20 to that portion of channel 2 near terminal 16 is blocked from terminal 18. At frequencies lower than the frequency at which the first null appears in the transmission between terminals 16 and 18, signal is transmitted between terminals 16 and 18.

Figure 2:
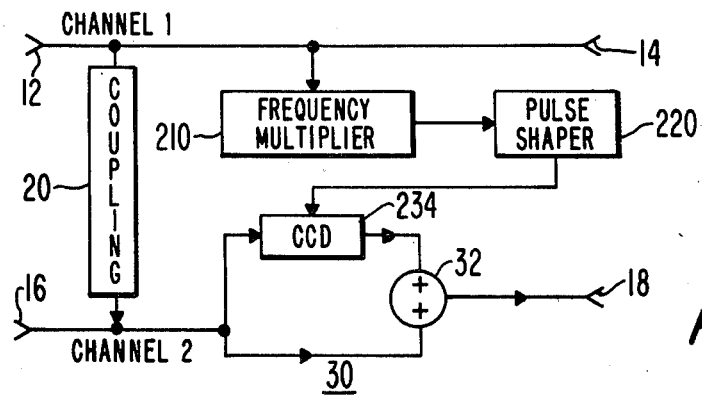
FIG. 2 illustrates a preferred embodiment of the invention in which a charge-coupled device is used.

FIG. 2 illustrates an arrangement similar to that of FIG. 1, and corresponding elements are given the same reference numbers. In FIG. 2, controllable delay 34 is implemented as a charge transfer device, specifically of the type known as a charge-coupled device (CCD). In such devices, the delay is determined by the number of cells of the CCD and by the rate of the clock. The CCD used in this manner is a sampling device and consequently the sampling rate must be high by comparison with the signals being sampled. A frequency multiplier 210 has its input coupled to channel 1 and multiplies the frequency of the FM signal by an appropriate amount, such as for example four times. The quadrupled-frequency signal produced by multiplier 210 is applied to the clock input of CCD 234 by way of pulse shaping circuit 220, which performs any shaping and signal amplification necessary to match the requirements for driving CCD 234. Charge-coupled device 234 has a number of cells equal to an odd integer multiple of one-half the frequency-multiplication ratio of multiplier 210. For example, where multiplier 210 multiplies the frequency of the signal on channel 1 by a factor of four times, CCD 234 may have 2, 6, . . . cells. Thus, the delay provided by CCD 234 is equal to an integer number of whole cycles plus one-half period of the signal on channel 1 (corresponding to 180° delay).

The 180° delay of the crosstalk signal inverts the phase of the crosstalk signal before application to summing circuit 32, with the result that the crosstalk signal is cancelled at output terminal 18. The channel 2 signal at frequencies other than the rejection frequency of transversal filter 30 appears substantially in-phase at the inputs of summing circuit 32 and is coupled to output terminal 18.

Figure 3:
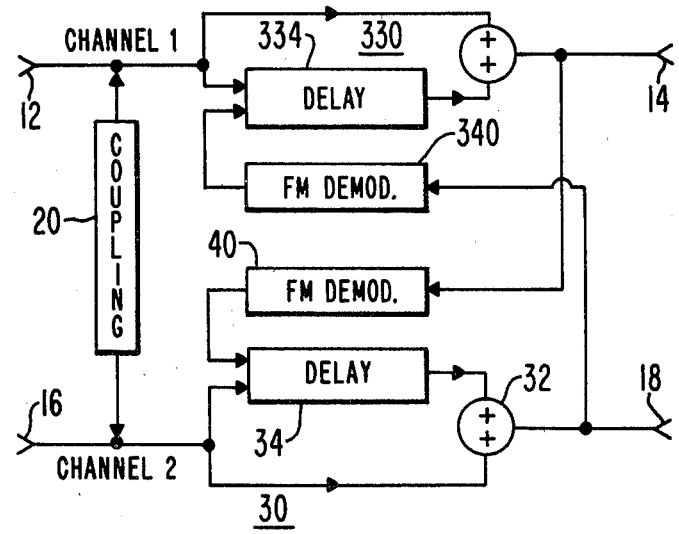
FIG. 3 illustrates two signal channels with bilateral filtration.

In FIG. 3, recognition is taken of the fact that coupling element 20 may couple signals from channel 2 to channel 1 as well as from channel 1 to channel 2, and that by use of a filter 330 coupled to channel 1 and controlled by the signal in channel 2, the effects of crosstalk into channel 1 may also be reduced. The input to demodulator 40 is illustrated in FIG. 3 as being taken from terminal 14 of channel 1. However, the input to demodulator 40 may also be taken from terminal 12. Similarly, demodulator 340 which controls filter 330 may have its input coupled to terminal 16 of channel 2 rather than to terminal 18.

Figure 4:
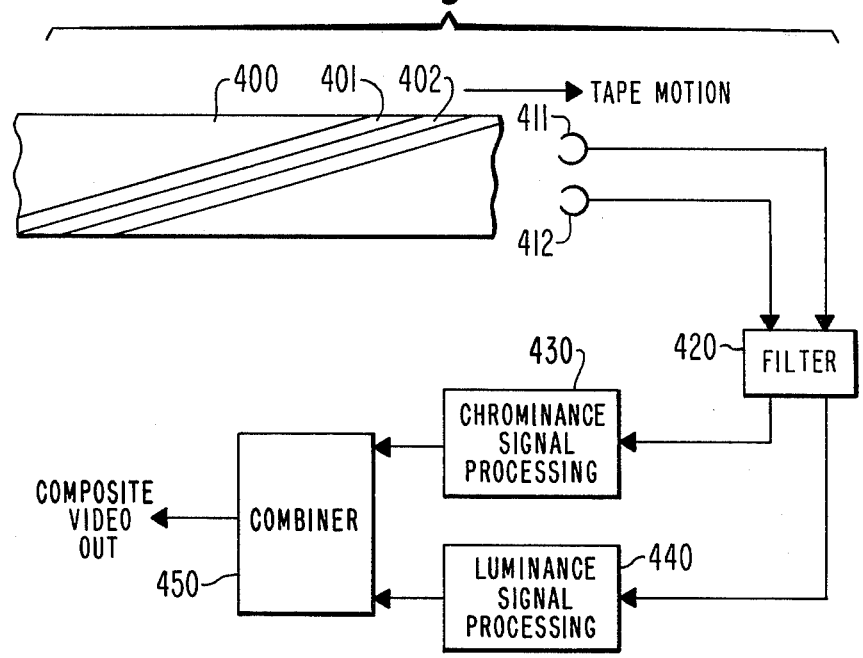
FIG. 4 illustrates the invention in the context of a tape playback machine.

In FIG. 4, a tape 400 bearing recorded tracks 401 and 402 scans across a luminance channel playback head 411 and a chrominance channel playback head 412. Both the luminance and chrominance information are FM modulated within the same general frequency range on the tape. The chrominance signal may be line-sequential chrominance similar to that used in the SECAM system. Because of mistracking of playback heads 411 and 412 with respect to recorded tracks 401 and 402, or because of reactive coupling between the heads and possibly for other reasons, a certain crosstalk occurs between the channels. In particular, the luminance channel is subject to crosstalk from the chrominance channel. When a flat field of color is displayed, the chrominance FM carrier is at a fixed frequency for a significant interval. That signal frequency, when coupled into the luminance channel, will be demodulated by the luminance channel signal processing unless removed by a filter in accordance with the invention. In the absence of the invention, the chrominance signal carrier will be at a particular fixed frequency during a flat color field, and that fixed frequency will interact with the luminance information in the luminance channel to cause visible patterns in the displayed video. A filter 420 such as that described in conjunction with FIG. 1 or 2 may be interposed between heads 411 and 412 and luminance and chrominance signal processing blocks 430 and 440 so as to reduce the chrominance signal in the luminance channel and thereby reduce the visible beats.

When the colors are changed rapidly, the deviation of the chrominance signal carrier results in the generation of signal sidebands associated with the chrominance signal. These sidebands will also be coupled to the luminance channel. The sidebands may not be attenuated by filter 420. However, this will not substantially degrade the displayed image, because the sidebands have a lower energy and hence a lower amplitude than the chrominance signal carrier, and the beat pattern is therefore weaker and less visible. The displayed image is not substantially degraded also because the frequency of the sidebands tends to change in a relatively random manner, with the result that no fixed pattern results from the interaction of the sideband luminance signal. In effect, the sidebands create a form of distortion similar in appearance to noise, rather than in the more visible form of an interference pattern.

Other embodiments of the invention will be obvious to those skilled in the art. For example, any form of variable-frequency notch filter may be used rather than a transversal filter. Such notch filters might for example include bridged-tee inductance-capacitance filters with voltage-variable capacitors for frequency change. Crosstalk from one channel into several different channels may be corrected by a multiplicity of filters in the affected channels, each controlled from the source of crosstalk. Similarly, several sources of crosstalk affecting the single channel may be corrected by a cascade of filters in the affected channel, each controlled from one of the source channels. Other applications of the invention will also be apparent, as for example in the luminance and chrominance channels of a television apparatus.

What is claimed is:
1. An improved two-channel arrangement comprising:
   a first signal channel carrying a frequency-modulated carrier signal;
   a second signal channel;
   coupling means coupling said first and second signal channels together whereby said frequency- modulated carrier signal appears in said second signal channel;

wherein the improvement comprises variable-frequency filter means coupled to said first and second signal channels for filtering from said second signal channel signals at the instantaneous frequency of said frequency-modulated carrier signal.

2. An arrangement according to claim 1, wherein said coupling means is a stray inductive coupling.

3. An arrangement according to claim 1, wherein said variable-frequency filter means comprises a transversal filter.

4. An arrangement according to claim 1, wherein said variable-frequency filter comprises variable delay means coupled in said second signal channel, the delay of said variable delay means being controlled by the frequency of said frequency-modulated carrier signal.

5. An arrangement according to claim 4, wherein the delay of said variable delay means is an integral multiple of the duration of half of a single cycle of said frequency-modulated carrier signal.

6. An arrangement according to claim 5, wherein said integral multiple is one.

7. An arrangement according to claims 4, 5 or 6, wherein said variable-frequency filter further comprises summing means coupled in said second signal channel; and wherein an output of said variable delay means is coupled to an input of said summing means to filter from said second channel said frequency-modulated carrier signal.

8. A television playback apparatus for playing back a record comprising two channels, a first channel of which includes desired first information and a second channel of which includes frequency-modulated second information, comprising:

first and second playback means adapted for reproducing said first and second information, said first channel being subject to distortion resulting from crosstalk of said frequency-modulated second information; and variable-frequency filter means coupled to said first and second playback means for filtering from said first channel in a tracking relationship at least those signals at the frequency of said frequency-modulated carrier.

9. An apparatus according to claim 8, wherein said variable-frequency filter means comprises a variable-frequency transversal filter.

10. An apparatus according to claim 9, wherein said transversal filter comprises a charge-transfer delay device.

11. An apparatus according to claim 10, wherein said charge-transfer delay device is a charge-coupled device.

12. An apparatus according to claim 11 further comprising signal processing means coupling said second channel to said charge-coupled device for clocking said charge-coupled device in response to said frequency-modulated information.

13. An apparatus according to claim 12, wherein said signal processing means comprises frequency multiplication means for multiplying the frequency of said frequency-modulated second information by a first integer; and wherein said charge-coupled device includes a number of cells equal to a second integer multiple of half of said first integer.

14. An apparatus according to claim 12, wherein said signal processing means comprises frequency multiplication means for multiplying the frequency of said frequency-modulated second information by four, and wherein said charge-coupled device includes two cells.

15. An apparatus according to claim 8 wherein said first information is television luminance and said second information is television chrominance.

* * * * *